US009802863B1

(12) United States Patent
Geal, III et al.

(10) Patent No.: US 9,802,863 B1
(45) Date of Patent: Oct. 31, 2017

(54) ACCELERATING SET TIMES OF FLOWABLE FILL COMPOSITIONS WITH DRY CALCIUM CHLORIDE, AND METHODS OF UTILIZING AND PRODUCING THE SAME

(71) Applicants: George Clarence Geal, III, Parker, CO (US); Stanley R. Peters, Castle Rock, CO (US)

(72) Inventors: George Clarence Geal, III, Parker, CO (US); Stanley R. Peters, Castle Rock, CO (US)

(73) Assignee: Flashfill Services, LLC, Henderson, CO (US)

( * ) Notice: Subject to any disclaimer, the term of this patent is extended or adjusted under 35 U.S.C. 154(b) by 0 days.

(21) Appl. No.: 15/453,452

(22) Filed: Mar. 8, 2017

Related U.S. Application Data

(60) Provisional application No. 62/305,859, filed on Mar. 9, 2016.

(51) Int. Cl.
*C04B 22/12* (2006.01)
*C04B 28/04* (2006.01)
*C04B 20/00* (2006.01)
*C04B 18/08* (2006.01)
*C04B 103/12* (2006.01)
*C04B 111/00* (2006.01)

(52) U.S. Cl.
CPC ............ *C04B 22/124* (2013.01); *C04B 18/08* (2013.01); *C04B 20/0008* (2013.01); *C04B 28/04* (2013.01); *C04B 2103/12* (2013.01); *C04B 2111/0075* (2013.01); *C04B 2111/00663* (2013.01)

(58) Field of Classification Search
CPC ... C04B 22/124; C04B 28/04; C04B 20/0008; C04B 18/08; C04B 2103/12; C04B 2111/00663; C04B 2111/0075
See application file for complete search history.

(56) References Cited

U.S. PATENT DOCUMENTS

| | | | |
|---|---|---|---|
| 1,782,471 A | 11/1930 | Kirchener | |
| 1,968,152 A | 7/1934 | Kirchener | |
| 2,307,485 A | 1/1943 | Booth | |
| 2,434,301 A | 1/1948 | Wertz | |
| 2,600,018 A | 6/1952 | Nelson et al. | |
| 2,806,531 A | 9/1957 | Morgan et al. | |
| 2,819,171 A | 1/1958 | Benedict et al. | |
| 2,820,713 A | 1/1958 | Wagner | |
| 2,890,965 A | 6/1959 | Underdown et al. | |
| 3,008,843 A | 11/1961 | Jolly | |
| 3,427,175 A | 2/1969 | Angstadt et al. | |
| 4,042,408 A | 8/1977 | Murray et al. | |
| 4,209,336 A | 6/1980 | Previte | |
| 4,264,367 A | 4/1981 | Schutz | |
| 4,444,593 A | 4/1984 | Schutz | |
| 5,106,422 A | 4/1992 | Bennett et al. | |
| 5,211,751 A | 5/1993 | Arfaei et al. | |
| 5,736,594 A * | 4/1998 | Boles | C04B 16/08 428/212 |
| 5,785,751 A | 7/1998 | Bashlykov et al. | |
| 6,485,561 B1 | 11/2002 | Dattel | |
| 6,641,658 B1 * | 11/2003 | Dubey | C04B 28/16 106/695 |
| 6,648,962 B2 | 11/2003 | Berke et al. | |
| 6,869,474 B2 | 3/2005 | Perez-Pena et al. | |
| 7,029,527 B2 | 4/2006 | Gaudry et al. | |
| 7,427,321 B2 | 9/2008 | Hilton et al. | |
| 7,670,427 B2 | 3/2010 | Perez-Pena et al. | |
| 7,842,348 B2 | 11/2010 | Abbott et al. | |
| 8,167,998 B2 | 5/2012 | Ladely et al. | |
| 8,747,547 B1 | 6/2014 | Peters et al. | |

(Continued)

FOREIGN PATENT DOCUMENTS

| | | |
|---|---|---|
| BE | 508098 A1 | 1/1952 |
| BE | 582948 A1 | 1/1960 |
| CA | 412214 A | 5/1943 |
| CA | 419133 A | 3/1944 |
| CA | 419134 A | 3/1944 |
| CA | 419135 A | 3/1944 |
| CA | 462493 A | 1/1950 |
| CA | 520832 A | 1/1956 |
| CA | 566361 A | 11/1958 |
| CA | 607361 A | 10/1960 |

(Continued)

OTHER PUBLICATIONS

Bost et al., "Comparison of the accelerating effect of various additions on the early hydration of Portland cement," Construction and Building Materials, Jun. 15, 2016, 2 pages.
Juenger et al., "A soft X-ray microscope investigation into the effects of calcium chloride on tricalcium silicate hydration," Cement and Concrete Research, Jan. 1, 2005, 2 pages.
Kosmatka et al., "Design and Control of Concrete Mixtures," The guide to applications, methods, and materials, 15th edition, Engineering Bulletin 001, Portal Cement Association, 2011, p. 91.

(Continued)

*Primary Examiner* — Anthony J Green

(57) ABSTRACT

Fast-setting Portland cement compositions for filling voids, such as mine shafts and excavated utility trenches, are described. The Portland cement compositions set quickly and are useful when traditional slow setting compositions are less desirable. The acceleration of the set time results from the addition of dry calcium chloride to the Portland cement composition. The compositions consist of Portland cement, dry calcium chloride, water and sometimes preformed cellular foam. Some compositions can include also include fly ash. The compositions may have a compressive strength of between 0 psi and 30 psi after 4 hours, a compressive strength of between 30 psi and 120 psi after 24 hours, a compressive strength of between 200 psi and 500 psi after 28 days, a penetration resistance of between 0.1 tsf and 5 tsf after 10 hours, a penetration resistance of between 0.8 tsf and 10 tsf after 24 hours, and a removability modulus of between 0.2 and 1.0 after 28 days. Also disclosed are methods of filling a void with fast-setting Portland cement.

16 Claims, No Drawings

(56) References Cited

U.S. PATENT DOCUMENTS

| | | | |
|---|---|---|---|
| 8,822,567 B2 | 9/2014 | Kono et al. | |
| 9,038,719 B2 | 5/2015 | Crews | |
| 9,382,156 B2 * | 7/2016 | Ren | C04B 28/02 |
| 2002/0117088 A1 | 8/2002 | Norman et al. | |
| 2003/0041785 A1 | 3/2003 | Harrison | |
| 2008/0227891 A1 | 9/2008 | Jarvie et al. | |
| 2009/0114126 A1 | 5/2009 | Roddy et al. | |
| 2010/0064943 A1 | 3/2010 | Guevara et al. | |
| 2010/0095871 A1 | 4/2010 | Patil et al. | |
| 2011/0021668 A1 | 1/2011 | Hamai et al. | |
| 2012/0037046 A1 | 2/2012 | Le Rolland et al. | |
| 2012/0040165 A1 | 2/2012 | Dubey | |
| 2014/0083698 A1 | 3/2014 | Stone et al. | |
| 2014/0138007 A1 | 5/2014 | Dubey et al. | |
| 2014/0311387 A1 | 10/2014 | Hohn et al. | |
| 2015/0175887 A1 | 6/2015 | Welker | |
| 2015/0240163 A1 | 8/2015 | Welker | |
| 2015/0291476 A1 | 10/2015 | Al-mutlaq | |

FOREIGN PATENT DOCUMENTS

| | | |
|---|---|---|
| CA | 607391 A | 10/1960 |
| CA | 625024 A | 8/1961 |
| CA | 713618 A | 7/1965 |
| CA | 900635 A | 5/1972 |
| CA | 1204456 | 5/1986 |
| CN | 101670619 A | 3/2010 |
| DE | 1807608 A1 | 6/1970 |
| EP | 114448 A1 | 8/1984 |
| EP | 127960 A1 | 12/1984 |
| EP | 402306 A1 | 12/1990 |
| EP | 2520553 A1 | 11/2012 |
| EP | 1532080 B1 | 3/2014 |
| EP | 2832706 A1 | 2/2015 |
| EP | 2414301 B1 | 11/2015 |
| FR | 38549 E | 6/1931 |
| FR | 1591415 A | 4/1970 |
| FR | 2061507 A2 | 6/1971 |
| GB | 301509 A | 1/1930 |
| GB | 430781 A | 6/1935 |
| GB | 791622 A | 3/1958 |
| GB | 833071 A | 4/1960 |
| GB | 1181331 A | 2/1970 |
| GB | 1315225 A | 5/1973 |
| IN | 154852 A1 | 12/1984 |
| IN | 159750 A1 | 6/1987 |
| JP | 06040756 A | 2/1994 |
| JP | 06298552 A | 10/1994 |
| JP | 1996029963 B2 | 3/1996 |
| JP | 2802972 B2 | 9/1998 |
| JP | 11217253 A | 8/1999 |
| JP | 2000007402 A | 1/2000 |
| JP | 2000095554 A | 4/2000 |
| JP | 3125316 B2 | 1/2001 |
| JP | 2004002080 A | 1/2004 |
| JP | 3558730 B2 | 8/2004 |
| JP | 2005324982 A | 11/2005 |
| JP | 2006298661 A | 11/2006 |
| JP | 4157485 B2 | 10/2008 |
| JP | 4290628 B2 | 7/2009 |
| JP | 4348001 B2 | 10/2009 |
| JP | 2010150105 A | 7/2010 |
| JP | 4626541 B2 | 2/2011 |
| JP | 4705455 B2 | 6/2011 |
| JP | 4725742 B2 | 7/2011 |
| JP | 4813822 B2 | 11/2011 |
| JP | 4837161 B2 | 12/2011 |
| JP | 4860396 B2 | 1/2012 |
| JP | 4877886 B2 | 2/2012 |
| JP | 5051990 B2 | 10/2012 |
| JP | 5113496 B2 | 1/2013 |
| JP | 2013170436 | 9/2013 |
| JP | 2013077378 A1 | 4/2015 |
| JP | 2015124141 A | 7/2015 |
| JP | 2015229684 A | 12/2015 |
| KR | 100311286 B1 | 9/2001 |
| KR | 1020120016432 A | 2/2012 |
| LU | 57288 | 2/1969 |
| RU | 2099302 C1 | 12/1997 |
| RU | 2102356 C1 | 1/1998 |
| RU | 2119900 C1 | 10/1998 |
| RU | 2186942 C1 | 8/2002 |
| RU | 2257294 C1 | 7/2005 |
| RU | 2337124 C1 | 10/2008 |
| RU | 2434923 C1 | 11/2011 |
| RU | 2470979 C1 | 12/2012 |
| RU | 2497861 C1 | 11/2013 |
| RU | 2525408 C1 | 8/2014 |
| RU | 2542063 C1 | 2/2015 |
| RU | 2545208 C1 | 3/2015 |
| RU | 2553807 C1 | 6/2015 |
| RU | 2555683 C1 | 7/2015 |
| SU | 848594 A1 | 7/1981 |
| SU | 876960 A1 | 10/1981 |
| SU | 1411439 A1 | 7/1988 |
| SU | 1435762 A1 | 11/1988 |
| SU | 1585309 A1 | 8/1990 |
| SU | 1682531 A1 | 10/1991 |
| WO | 8601795 A1 | 3/1986 |
| WO | 0051947 A1 | 9/2000 |
| WO | 2008130107 A1 | 10/2008 |
| WO | 2010047919 A1 | 4/2010 |
| WO | 2011139466 A1 | 11/2011 |
| WO | 2012136963 A1 | 10/2012 |
| WO | 2014068409 A2 | 5/2014 |
| WO | 2014072533 A1 | 5/2014 |
| WO | 2015034531 A1 | 3/2015 |
| WO | 2015034543 A1 | 3/2015 |
| WO | 2015130284 A1 | 9/2015 |
| WO | 2016043500 A1 | 3/2016 |

OTHER PUBLICATIONS

Odler et al., "On the combined effect of water solubles lignosulfonates and carbonates on Portland cement and clinker pastes 1. Physical properties," Cement and Concrete Research, Jul. 1, 1978, 2 pages.

Rapp, "Effect of Calcium Chloride on Portland Cements and Concretes," Journal of Research of the National Bureau of Standars, Apr. 1, 1935, 2 pages.

Rosenberg, "Study of the Mechanism Through Which Calcium Chloride Accelerates the Set of Portland," Oct. 1, 1964, 2 pages.

Williams et al., "Developing Mixture Proportion Guidance for Field-Prepared Rapid-Setting Materials for Emergency Airfield Repairs," Feb. 8, 2012, 2 pages.

Witlbank et al., "Effect of Selected Accelerants on the Physical Properties of Mineral Trioxide Aggregate and Portland Cement," Journal of Endodontics, Oct. 1, 2007, 2 pages.

* cited by examiner

ACCELERATING SET TIMES OF FLOWABLE FILL COMPOSITIONS WITH DRY CALCIUM CHLORIDE, AND METHODS OF UTILIZING AND PRODUCING THE SAME

RELATED APPLICATIONS

This application claims priority to U.S. Provisional Patent Application Ser. No. 62/305,859, filed Mar. 9, 2016, which is fully incorporated herein by reference.

INTRODUCTION

Demands of construction have accelerated in the last several years. Contractors are pressured to fill voids, for example, mine shafts and excavated utility trenches, in much less time than was traditionally required. Traditional Portland cement-sand Controlled Low Strength Materials (CLSM) can take 8 to 12, even up to 24 hours to harden enough to be suitable for use, for example, to support the weight of traffic.

The problem with accelerating the set time of CLSM compositions (e.g., using accelerators to decrease the set time of cement) in order to meet the reduced-time demands of modern construction is that the use of accelerants to decrease set time leads to compositions that result in an increased compressive strength of the final set composition. Increased final compressive strengths are unfavorable for future excavation. Traditional Portland-cement based CLSMs as defined by the American Concrete Institute (ACI) 229 defines CLSMs as materials having compressive strength of 1200 psi or less, and suggests 300 pounds per square inch (psi) as the upper limit of compressive strength to permit easier excavation at a later date. The upper limit of 1200 psi allows for the use of this material in applications where future excavation is unlikely, such as structural fill under buildings. Entities often times prefer 100-200 psi for ease of later excavation.

The present disclosure generally relates to accelerating the set-times of Portland cement by using a dry calcium chloride (e.g., prill, flake, or combination thereof) as an accelerant to produce a fast-setting flowable fill for rapid filling of voids. We have discovered that the use of dry calcium chloride as an accelerant in the disclosed compositions allows the composition to solidify much faster than normal chemical admixtures designed for accelerating normal Portland cement concrete can achieve, including commercially available calcium chloride in liquid form. For example, liquid calcium chloride is traditionally used as an accelerant at less than 2% by weight of the cement according to industry standards. In stark contrast, the disclosed compositions of the present invention contemplate the use of dry calcium chloride at a much higher weight percent as discussed in detail herein.

The disclosed compositions are useful for filling portions of voids, such as mine shafts and excavated utility trenches, where traditional slow setting mixtures are not desired. Another application for compositions of the present disclosure is in underground mines where tunnels and mine shafts require a seal to control air flow and/or seal off underground coal mine fires. Traditional lightweight, cellular concretes made with traditional Portland cement are very fluid and pumpable, but require too long of a setting time to accomplish adequate seals in the tunnels and mine shafts. The disclosed compositions also provide an alternative means of producing a rapid-setting utility backfill material in areas that rapid-setting Class C fly ash is not available.

SUMMARY

The present disclosure identifies a fast setting composition for filling voids comprising or in consisting essentially of between 40% and 80% Portland cement by weight of the composition, between 0.1% and 20% dry calcium chloride by weight of the composition, between 20% and 50% water by weight of the composition, and between 0.5% and 10% preformed cellular foam. The composition having a compressive strength of between 0.1 psi and 50 psi after 4 hours, a compressive strength of between 30 psi and 150 psi after 24 hours, a compressive strength of between 200 psi and 500 psi after 28 days, a penetration resistance of between 0.1 tsf and 5 tsf after 10 hours, a penetration resistance of between 0.8 tsf and 10 tsf after 24 hours, and a removability modulus of between 0.2 and 1.0 after 28 days.

In certain embodiments, the Portland cement is between 50% and 70% by weight of the composition and is Type 1, Type 2, and/or Type 3 Portland cement.

Embodiments of the disclosure will include dry calcium chloride in prill form (e.g., pelletized granules), flake form, additional dry forms, or combinations thereof. In certain embodiments the dry calcium chloride is between 3% and 20% by weight of the composition (between 5% and 15% by weight of the cement.)

In certain embodiments, the water is between 30% and 40% by weight of the composition and the preformed cellular foam is between 2% and 4% by weight of the composition (e.g., 50% to 70% by volume of composition). Embodiment of the invention will include compositions having fly ash.

The disclosure contemplates embodiments where the composition has between 50% and 70% Portland cement by weight of the composition, between 3% and 20% dry calcium chloride by weight of the composition, between 30% and 40% water by weight of the composition, between 2% and 4% preformed cellular foam, and the composition has a compressive strength of between 3 psi and 20 psi after 4 hours, a compressive strength of between 60 psi and 100 psi after 24 hours, a compressive strength of between 290 psi and 400 psi after 28 days, a penetration resistance of between 1.0 tsf and 4 tsf after 10 hours, a penetration resistance of between 2 tsf and 5 tsf after 24 hours, and a removability modulus of between 0.4 and 0.6 after 28 days.

The disclosure further contemplates methods of filling voids using a disclosed composition. While the disclosure will be described with respect to preferred embodiment configurations and with respect to particular compositions or methods used therein, it will be understood that the disclosure is not to be construed as limited in any manner by either such configuration or components described herein. Also, while the particular types of equipment, compositions and uses are described herein, it will be understood that such particular compositions, equipment or uses are not to be construed in a limiting manner. Instead, the functionality of those compositions and methods should be appreciated. These and other variations of the disclosure will become apparent to those skilled in the art upon a more detailed description of the disclosure.

The advantages and features which characterize the disclosure are pointed out with particularity in the claims annexed hereto and forming a part hereof. For a better understanding of the disclosure, however, reference should be had to the examples, which form a part hereof and to the accompanying descriptive matter, in which there is illustrated and described embodiments of the disclosure. The provisional application to which this application claims priority are incorporated herein in their entirety.

DETAILED DESCRIPTION

The present disclosure provides compositions and methods for accelerating the set time of CLSM used for filling voids while maintaining a low final compressive strength (e.g., less than 400 psi at 28 days). The set time of the CLSM is accelerated using dry calcium chloride as opposed to liquid calcium chloride. The difference is that compositions using dry calcium chloride generate heat when hydrating with water, which accelerates the hydration of the Portland cement in the compositions before the chemical acceleration of the calcium chloride begins. Therefore, dry calcium chloride accelerates the hardening of CLSM compositions based on the generation of heat, which causes an initial hydration of the Portland cement resulting in quicker setting times before the normal chemical reaction begins. The use of hot water with compositions is also contemplated.

The present disclosure reveals a fast-setting flowable fill composition, generating higher early strengths yet still sufficiently low ultimate strengths by using dry calcium chloride as an accelerant. In an embodiment, the present disclosure achieves these goals using an accelerant in combination with Portland cement, water, and preformed cellular foam.

An embodiment of the present disclosure includes a fast setting composition for filling voids comprising between 40% and 80% Portland cement by weight of the composition, between 0.1% and 20% dry calcium chloride by weight of the composition, between 20% and 50% water by weight of the composition, and between 0.5% and 10% preformed cellular foam. In an embodiment, the composition has a compressive strength of between 0.1 psi and 30 psi after 4 hours, a compressive strength of between 30 psi and 120 psi after 24 hours, a compressive strength of between 200 psi and 500 psi after 28 days, a penetration resistance of between 0.1 tsf and 5 tsf after 10 hours, a penetration resistance of between 0.8 tsf and 10 tsf after 24 hours, and a removability modulus of between 0.2 and 1.0 after 28 days.

In an embodiment of the present disclosure, the cementitious material is standard Portland cement, which is well known in the industry. The Portland cement of the present disclosure may be Type I, Type II, Type III, Type IV, Type V, or some combination thereof. In an embodiment, the Portland cement is Type I-II or Type III. Notably, when using Type III Portland cement the amount of dry calcium chloride necessary to achieve the same results as compositions using Type I-II Portland cement is less. In other words, compositions using Type III Portland cement require less dry calcium chloride to achieve similar results (accelerated set times) to compositions using Type I-II Portland cement. The Portland cement of the present disclosure can be obtained from a variety of sources based on economics, location, chemical properties, or additional criteria. For example, Portland cement can be obtained from CEMEX, 5134 Ute Rd, Longmont, Colo. 80503.

In an embodiment of the present disclosure, a composition has between about 40% and about 80% Portland cement by weight of the composition, between about 45% and about 75% Portland cement, between about 50% and about 70% Portland cement, or between about 55% and about 65% Portland cement by weight of the composition.

In some embodiments of the present disclosure, a composition has a measurable amount of, but less than about 80% Portland cement by weight of the composition, less than about 70% Portland cement, less than about 65% Portland cement, less than about 60% Portland cement, less than about 55% Portland cement, less than about 50% Portland cement, or less than about 45% Portland cement by weight of the composition.

In additional embodiments of the present disclosure, the composition has greater than about 40% Portland cement by weight of the composition, greater than about 45% Portland cement, greater than about 50% Portland cement, greater than about 55% Portland cement, greater than about 60% Portland cement, greater than about 65% Portland cement, greater than about 70% Portland cement, greater than about 75% Portland cement, or a greater than about 80% Portland cement by weight of the composition.

In an embodiment of the present disclosure, the accelerant is dry calcium chloride. The dry calcium chloride of the present disclosure may be in prill form, flake form, another dry form of calcium chloride, or some combination thereof. The dry calcium chloride contemplated by the present disclosure can be obtained from a variety of sources based on economics, location, chemical properties, or additional criteria. For example, dry calcium chloride can be obtained as DowFlake® Xtra from the Dow Chemical Company or Hi 94 Calcium Chloride Prills from Hill Brothers Chemical Company.

In an embodiment of the present disclosure, a composition has between about 0.1% and about 20% dry calcium chloride by weight of the composition, between about 3% and about 15% dry calcium chloride, between about 4% and about 10% dry calcium chloride, between about 4% and about 8% dry calcium chloride, or between about 4% and about 7% dry calcium chloride by weight of the composition.

In some embodiments of the present disclosure, a composition has a measurable amount of, but less than about 25% dry calcium chloride by weight of the composition, less than about 20% dry calcium chloride, less than about 17% dry calcium chloride, less than about 15% dry calcium chloride, less than about 12% dry calcium chloride, less than about 10% dry calcium chloride, or less than about 8% dry calcium chloride by weight of the composition.

In additional embodiments of the present disclosure, the composition has greater than about 2% dry calcium chloride by weight of the composition, greater than about 3% dry calcium chloride, greater than about 4% dry calcium chloride, greater than about 6% dry calcium chloride, greater than about 8% dry calcium chloride, greater than about 10% dry calcium chloride, greater than about 12% dry calcium chloride, or greater than about 15% dry calcium chloride by weight of the composition.

In an embodiment of the presently disclosed composition, the water is standard city potable water. In another embodiment, the water used in the composition is substantially purified of additional minerals or other impurities. In still another embodiment of the present disclosure, the water is non-potable water. In additional embodiments, the water is selected based on its natural impurities, e.g., specific mineral content like calcium, magnesium, iron, or similar water minerals.

The water content of the presently disclosed composition may vary depending on desired flowability, setting time, and final compressive strength. In an embodiment of the present disclosure, a composition has the water content of between about 20% and about 50% by weight of the composition, between about 25% and about 45%, between about 25% and about 40%, between about 30% and about 45%, between about 30% and about 40%, or between about 35% and about 42% water by weight of the composition.

In additional embodiments, a composition has greater than about 15% water by weight of the composition, greater than about 20% water, greater than about 25% water, greater than about 30% water, greater than about 33% water, or greater than about 35% water by weight of the composition. In other embodiments, a composition has less than about 50% water by weight of the composition, less than about 45% water, less than about 42% water, less than about 40% water, less than about 37% water, less than about 35% water, or less than about 30% water by weight of the composition. Any water included with additional ingredients, e.g., aqueous water retarders, foaming agents, etc. under the circumstances encountered in the field by the inventors has been negligible in comparison to the primary batch water and therefore has not been included in the above calculations.

Some compositions of the present disclosure will include the addition of foam, e.g., the amount of air content within a composition can be controlled by varying cellular foam, which can be optimized for the ultimate strength gain desired, the ambient temperature during the void filling process, and the desired final properties. In specific embodiments, the air content may be achieved by adding a preformed cellular foam, e.g., Aerlite-ix foam liquid concentrate available from Aerix Industries, 7020 Snowdrift Road, Suite 102, Allentown, Pa. 18106 or 5916 McIntyre St, Golden, Colo. 80403. The cellular foam may be pervious or non-pervious, and pre-foamed thereby reducing or alleviating the need to vigorously agitate the composition to activate the air entraining agent. Any suitable foaming agent may be used that achieves the desired end properties as described herein, e.g., an anionic foaming agent, a cationic foaming agent or a non-ionic foaming agent. An example of a pervious foam is AQUAERiX. Examples of a non-pervious foam are Aerlite or Aerlite-ix. When water penetration is not desired, a non-pervious cellular foam is normally used. Suitable cellular foam is available from a variety of sources, e.g., Aerix industries; Provoton Foam Concrete, 28 East Larkspur Lane, Bristol, Ill. 60512; Allied Foam Tech Corp., 146 Keystone Dr. Montgomeryville, Pa. 18936; and Vermillion LLC and Associates, 2176 Sargent Daly Dr., Chattanooga, Tenn. 37421. In some embodiments, the foaming agent will conform to ASTM C869 and C796, in other embodiments the air entraining agent conforms to ASTM C260. Notably, the weight of the foam used in the below Examples was calculated based on an assumption of a 2.0 lb/cf foam density.

Beneficial air content in these accelerated mixtures can also be obtained with conventional air entraining admixtures (AEA) for Portland cement concrete, and generated through the mixing process. The amount of air entraining agent necessary for a given composition will vary with the desired air content, e.g., the desired final compressive strength.

In some embodiments, the final foam content of the composition, which is used to control the final compressive strength of the composition, will be between about 0.5% to about 15% by weight of the composition, about 1% to about 10%, about 2% to about 5%, about 2% to about 4% by weight of the composition. In some embodiments, the final foam content will be less than about 15%, less than about 12%, less than about 10%, less than about 8%, less than about 6%, less than about 4% by weight of the composition. In some embodiments, the final foam content will be greater than about 0.5%, greater than about 2%, greater than about 4%, greater than about 6%, or greater than about 8% by weight of the composition.

In some embodiments, the final air content of the composition will be between about 40% to about 70% by volume of the composition, about 50% to about 70% by volume of the composition, about 60% to about 70% by volume of the composition. In some embodiments, the final air content will be less than about 75%, less than about 70%, less than about 68%, or less than about 66%. In some embodiments, the final air content will be greater than about 50%, greater than about 55%, greater than about 60% or greater than about 62%.

In an embodiment of the present disclosure, the composition will include fly ash. Fly ash can be referred to as either cementitious or pozzolanic. A cementitious material is one that hardens when mixed with water. A pozzolanic material will also harden with water but only after activation with an alkaline substance such as lime.

Two major classes of fly ash are specified in ASTM C618 on the basis of their chemical composition resulting from the type of coal burned; these are designated Class F and Class C. Class F is fly ash normally produced from burning anthracite or bituminous coal, and Class C is normally produced from the burning of subbituminous coal or lignite. Class C fly ash usually has cementitious properties in addition to pozzolanic properties due to free lime, whereas Class F is rarely cementitious when mixed with water alone.

In an embodiment of the present disclosure, the composition has between about 2% and about 30% fly ash, between about 5% and about 25% fly ash, or between about 10% and 20% fly ash by weight of the composition. In certain embodiments, a composition of the present disclosure will have less than about 30% fly ash, less than about 25% fly ash, less than about 20% fly ash, less than about 15% fly ash, or less than about 10% fly ash by weight of the composition. In still other embodiments, a composition of the present disclosure will have greater than about 5% fly ash, greater than about 10% fly ash, greater than about 15% fly ash, or greater than about 20% fly ash.

In an embodiment of the present disclosure, the composition will include rock dust, which is commonly known as Bag House Fines (BHF). BHF are dust-sized micro aggregates that are typically, but not necessarily, captured in bag houses to prevent air pollution, and could be inert minerals, lime, cement kiln dust, or other chemical or mineral materials. Thus, BHF includes micro aggregates recovered via one or more of fabric filters (baghouses), wet scrubbers, electrostatic precipitators (wet or dry), and mechanical collectors (e.g., cyclones). BHF can be added to a composition as a Portland cement extender and/or partial replacement. For example, Portland cement and BHF in the composition could be in a 1 to 1 ratio or additional ratio consistent with the desired properties of the contemplated compositions.

Compositions of the present disclosure will have a range of compressive strengths at various times after the addition of a composition to a void. For example, a higher earlier compressive strength is advantageous when working when backfilling trenches in a roadway or other highly traveled area. The higher, earlier compressive strength allows for the backfilled void to be patched (e.g., achieving 20 psi at 4 hours) and the road to be reopened for use at an earlier time. Again, despite the desire for a high earlier compressive strength the final compressive strength must not exceed the local agency standards, i.e., maintain good removability modulus numbers.

In certain embodiments, the compressive strength is measured at 4 hours, 1 day, 7 days, and 28 days where the 28 day measurement is considered the final compressive strength.

In an embodiment, the compressive strength of a composition of the present disclosure as measured by ASTM D4832 at 4 hours will be between about 1 psi and about 50 psi, between about 2 psi and about 40 psi, between about 3 psi and about 30 psi. In additional embodiments, the compressive strength of a composition at 4 hours will be greater than about 1 psi, will be greater than about 2 psi, will be greater than about 5 psi, or will be greater than about 10 psi. In certain embodiments, the compressive strength of the composition at 4 hours will be less than about 50 psi, will be less than about 30 psi, will be less than about 25 psi, will be less than about 20 psi, will be less than about 15 psi, or will be less than about 10 psi.

In an embodiment, the compressive strength of a composition of the present disclosure as measured by ASTM D4832 at 1 day will be between about 25 psi and about 150 psi, between about 50 psi and about 125 psi, between about 75 psi and about 100 psi. In additional embodiments, the compressive strength of a composition at 1 day will be greater than about 25 psi, will be greater than about 40 psi, will be greater than about 50 psi, or will be greater than about 75 psi. In certain embodiments, the compressive strength of the composition at 1 day will be less than about 150 psi, will be less than about 125 psi, will be less than about 100 psi, will be less than about 75 psi, will be less than about 60 psi, or will be less than about 50 psi.

In an embodiment, the compressive strength of a composition of the present disclosure as measured by ASTM D4832 at 7 days will be between about 100 psi and about 300 psi, between about 150 psi and about 300 psi, between about 150 psi and about 250 psi. In additional embodiments, the compressive strength of a composition at 7 days will be greater than about 100 psi, will be greater than about 150 psi, will be greater than about 200 psi, or will be greater than about 250 psi. In certain embodiments, the compressive strength of the composition at 7 days will be less than about 400 psi, will be less than about 350 psi, will be less than about 300 psi, will be less than about 250 psi, will be less than about 225 psi, or will be less than about 200 psi.

In an embodiment, the compressive strength of a composition of the present disclosure as measured by ASTM D4832 at 28 days will be between about 150 psi and about 500 psi, between about 200 psi and about 450 psi, between about 300 psi and about 400 psi. In additional embodiments, the compressive strength of the composition at 28 days will be greater than about 200 psi, will be greater than about 250 psi, will be greater than about 300 psi, will be greater than about 350 psi, or will be greater than about 400 psi. In certain embodiments, the compressive strength of the composition at 28 days will be less than about 500 psi, less than about 450 psi, less than about 400 psi, less than about 350 psi, less than about 300 psi, less than about 250 psi, or less than about 200 psi.

Similar to compressive strength, compositions of the present disclosure will have a range of penetration resistances at various times after the addition of a composition to a trench depending on the desired properties of the composition. In certain embodiments, the penetration resistance is measured at 4 hours, 6 hours, 8 hours, 10 hours, and 24 hours.

In an embodiment, the penetration resistance of a composition of the present disclosure at 4 hours is between about 0.0 tsf and about 2.0 tsf, between about 0.25 tsf and about 1.5 tsf, or between about 0.5 tsf and about 1.0 tsf. In additional embodiments, the penetration resistance of a composition at 4 hours will be greater than about 0.0 tsf, greater than about 0.25 tsf, greater than about 0.5 tsf, greater than about 0.75 tsf, or greater than about 1.0 tsf. In additional embodiments, the penetration resistance of a composition at 4 hours will be less than about 2.0 tsf, less than about 1.75 tsf, less than about 1.5 tsf, less than about 1.0 tsf, or less than about 0.75 tsf.

In an embodiment, the penetration resistance of a composition of the present disclosure at 8 hours is between about 0.0 tsf and about 4.0 tsf, between about 0.25 tsf and about 3.5 tsf, or between about 0.5 tsf and about 3.0 tsf. In additional embodiments, the penetration resistance of a composition at 8 hours will be greater than about 0.5 tsf, great than about 0.75, tsf, greater than about 1.0 tsf, greater than about 1.25 tsf, or greater than about 1.5 tsf. In additional embodiments, the penetration resistance of a composition at 8 hours will be less than about 4.0 tsf, less than about 3.5 tsf, less than about 3.0 tsf, less than about 2.5 tsf, or less than about 2.0 tsf.

In an embodiment, the penetration resistance of a composition of the present disclosure at 10 hours is between about 0.0 tsf and about 5.0 tsf, between about 0.5 tsf and about 3.75 tsf, or between about 1.0 tsf and about 3.5 tsf. In additional embodiments, the penetration resistance of a composition at 10 hours will be greater than about 0.5 tsf, great than about 1.0, tsf, greater than about 1.5 tsf, greater than about 1.75 tsf, or greater than about 2.0 tsf. In additional embodiments, the penetration resistance of a composition at 10 hours will be less than about 4.5 tsf, less than about 4.0 tsf, less than about 3.5 tsf, less than about 2.5 tsf, or less than about 2.0 tsf.

In an embodiment, the penetration resistance of a composition of the present disclosure at 24 hours is between about 1.0 tsf and about 6.0 tsf, between about 2.0 tsf and about 5.0 tsf, or between about 2.5 tsf and about 4.5 tsf. In additional embodiments, the penetration resistance of a composition at 24 hours will be greater than about 1.5 tsf, great than about 2.0, tsf, greater than about 2.5 tsf, greater than about 3.0 tsf, or greater than about 3.5 tsf. In additional embodiments, the penetration resistance of a composition at 24 hours will be less than about 6.0 tsf, less than about 5.5 tsf, less than about 5.0 tsf, less than about 4.5 tsf, or less than about 4.0 tsf.

In an embodiment of the present disclosure, an important consideration is the possible re-excavation of a backfilled composition by standard or ordinary excavation equipment. One measure of how easily a previously backfilled composition can be removed is the Removability Modulus ("RE"). The Removability Modulus is a commonly used industry standard for assigning a value to how easily a backfilled composition can be removed. The lower the RE number the easier the backfilled composition can be re-excavated. The Removability Modulus can be determined by the following formula:

$$RE = \frac{W^{1.5} \times 104 \times C^{0.5}}{10^6}$$

W=in-situ unit weight (pcf)
C=28 day compressive strength (psi)

In an embodiment of the present disclosure, the RE factor of a composition is between about 0.1 and about 1.0, between about 0.2 and about 0.9, between about 0.3 and about 0.8, between about 0.4 and about 0.7, or between about 0.4 and about 0.6. In additional embodiments of the present disclosure, the RE factor of a composition is less than about 1.5, less than about 1.0, less than about 0.8, less than about 0.7, or less than about 0.6. In other embodiments of the present disclosure, the RE factor of a composition is greater than about 0.1, greater than about 0.2, greater than about 0.3, greater than about 0.4, greater than about 0.5, or greater than about 0.6.

In some embodiments of the present disclosure, the flowability may be determined using ASTM D6103, e.g., utilizing a moistened 3 inch diameter by 6 inch high open-ended cylinder filled with a composition. The composition is placed in the cylinder on a flat surface. The cylinder is then removed allowing the composition to flow over the surface into a pancake. The diameter of the pancake is a measure of the flowability of the composition.

In certain embodiments of the present disclosure, a composition does not include one or more of the following: does not include a water reducer, does not include fly ash, does not include a set retarder, does not include an accelerant other than dry calcium chloride, does not include liquid calcium chloride, does not include an aggregate.

The present disclosure also provides for a method of filling a void with a disclosed composition. In one embodiment, a method of filling a void with a composition comprising calcium chloride is contemplated.

EXAMPLES

Example 1

Eight compositions contemplated by the present disclosure and two controls were prepared for testing as disclosed in Table 1, using DowFlake® Xtra calcium chloride flake (83%-87% calcium chloride). The dry ingredients for each composition were assembled and mixed prior to the addition of water, followed by preformed foam, which allowed the dry calcium chloride flake to generate heat quickly resulting in a very hot reaction.

FPC-0 (control) contains 675 lbs/CY of Portland Type I/II cement, 405 lbs/CY of water, and 34.2 lbs/CY of preformed cellular foam based on the assumption that the foam has a density of 2.0 lbs/CF. FPC-0 contains 17.1 cf/CY of foam. FPC-0 does not contain any calcium chloride. The corresponding percentage by weight of the composition for each component of FPC-0 is also disclosed below in Table 1.

FPC-5 contains 655 lbs/CY of Portland Type I/II cement, 393 lbs/CY of water, 33 lbs/CY of dry calcium chloride flake, and 28 lbs/CY of preformed cellular foam based on the assumption that the foam has a density of 2.0 lbs/CF. FPC-5 contains 17.1 cf/CY of foam. The corresponding percentage by weight of the composition for each component of FPC-5 is also disclosed below in Table 1.

FPC-10 contains 635 lbs/CY of Portland Type I/II cement, 381 lbs/CY of water, 54 lbs/CY of dry calcium chloride flake, and 34.4 lbs/CY of preformed cellular foam based on the assumption that the foam has a density of 2.0 lbs/CF. FPC-10 contains 17.2 cf/CY of foam. The corresponding percentage by weight of the composition for each component of FPC-10 is also disclosed below in Table 1.

FPC-15 contains 617 lbs/CY of Portland Type I/II cement, 370 lbs/CY of water, 79 lbs/CY of dry calcium chloride flake, and 34.4 lbs/CY of preformed cellular foam based on the assumption that the foam has a density of 2.0 lbs/CF. FPC-15 contains 17.2 cf/CY of foam. The corresponding percentage by weight of the composition for each component of FPC-15 is also disclosed below in Table 1.

FPC-0-3 (control) contains 635 lbs/CY of Portland Type III cement, 445 lbs/CY of water, and 33.2 lbs/CY of preformed cellular foam based on the assumption that the foam has a density of 2 lbs/CF. FPC-0-3 contains 16.6 cf/CY of foam. FPC-0-3 does not contain any calcium chloride. The corresponding percentage by weight of the composition for each component of FPC-0-3 is also disclosed below in Table 1.

FPC-5-3 contains 617 lbs/CY of Portland Type III cement, 432 lbs/CY of water, 26 lbs/CY of dry calcium chloride flake, and 33.4 lbs/CY of preformed cellular foam based on the assumption that the foam has a density of 2.0 lbs/CF. FPC-5-3 contains 16.7 cf/CY of foam. The corresponding percentage by weight of the composition for each component of FPC-5-3 is also disclosed below in Table 1.

FPC-10-3 contains 600 lbs/CY of Portland Type III cement, 420 lbs/CY of water, 51 lbs/CY of dry calcium chloride flake, and 33.4 lbs/CY of preformed cellular foam based on the assumption that the foam has a density of 2.0 lbs/CF. FPC-10-3 contains 16.7 cf/CY of foam. The corresponding percentage by weight of the composition for each component of FPC-10-3 is also disclosed below in Table 1.

FPC-15-3 contains 584 lbs/CY of Portland Type III cement, 409 lbs/CY of water, 75 lbs/CY of dry calcium chloride flake, and 33.6 lbs/CY of preformed cellular foam based on the assumption that the foam has a density of 2.0 lbs/CF. FPC-15-3 contains 16.8 cf/CY of foam. The corresponding percentage by weight of the composition for each component of FPC-15-3 is also disclosed below in Table 1.

PFF-10 contains 720 lbs/CY of Portland Type I/II cement, 360 lbs/CY of water, 61 lbs/CY of dry calcium chloride flake, and 35.2 lbs/CY of preformed cellular foam based on the assumption that the foam has a density of 2.0 lbs/CF. PFF-10 contains 17.6 cf/CY of foam. The corresponding percentage by weight of the composition for each component of PFF-10 is also disclosed below in Table 1.

PFF-20 contains 720 lbs/CY of Portland Type I/II cement, 360 lbs/CY of water, 122 lbs/CY of dry calcium chloride flake, and 35.2 lbs/CY of preformed cellular foam based on the assumption that the foam has a density of 2.0 lbs/CF. PFF-20 contains 17.6 cf/CY of foam. The corresponding percentage by weight of the composition for each component of PFF-20 is also disclosed below in Table 1.

The amount of calcium chloride in each composition disclosed in Table 1 was calculated assuming an average of 85% purity in DowFlake® Xtra calcium chloride flake, which reports a purity of 83%-87% calcium chloride.

TABLE 1

Compositions of the Present Disclosure.

| Mix ID | Composition (lb/CY) | | | | Composition (%) | | | | Foam (cf/CY) | Foam (% vol) |
|---|---|---|---|---|---|---|---|---|---|---|
| | Cement | Water | CaCl | Foam | Cement | Water | CaCl | Foam | | |
| FPC-0 | 675 | 405 | 0 | 34.2 | 60.6% | 36.3% | 0.0% | 3.1% | 17.1 | 63% |
| FPC-5 | 655 | 393 | 28 | 34.2 | 58.7% | 35.2% | 2.5% | 3.1% | 17.1 | 63% |
| FPC-10 | 635 | 381 | 54 | 34.4 | 57.0% | 34.2% | 4.8% | 3.1% | 17.2 | 64% |
| FPC-15 | 617 | 370 | 79 | 34.4 | 55.4% | 33.2% | 7.1% | 3.1% | 17.2 | 64% |

TABLE 1-continued

Compositions of the Present Disclosure.

| | Composition (lb/CY) | | | | Composition (%) | | | | Foam (cf/CY) | Foam (% vol) |
|---|---|---|---|---|---|---|---|---|---|---|
| Mix ID | Cement | Water | CaCl | Foam | Cement | Water | CaCl | Foam | | |
| FPC-0-3 | 635 | 445 | 0 | 33.2 | 57.0% | 40.0% | 0.0% | 3.0% | 16.6 | 61% |
| FPC-5-3 | 617 | 432 | 26 | 33.4 | 55.4% | 38.8% | 2.3% | 3.0% | 16.7 | 62% |
| FPC-10-3 | 600 | 420 | 51 | 33.4 | 53.9% | 37.7% | 4.6% | 3.0% | 16.7 | 62% |
| FPC-15-3 | 584 | 409 | 75 | 33.6 | 52.4% | 36.7% | 6.7% | 3.0% | 16.8 | 62% |
| PFF-10 | 720 | 360 | 61 | 35.2 | 60.6% | 30.3% | 5.1% | 3.0% | 17.6 | 65% |
| PFF-20 | 720 | 360 | 122 | 35.2 | 57.2% | 28.6% | 9.7% | 2.8% | 17.6 | 65% |

Example 2

The penetration resistance data (tsf) at 1 hour, 2 hours, 4 hours, 6 hours, 8 hours, 10 hours, and 24 hours for the compositions disclosed in Example 1 is presented Table 2. Table 2 also discloses the water to cement ratio (W/C) for each composition, the unit weight (UW (pcf)) for each composition as measured using ASTM C138, and the spread (in) as measured using ASTM D6103. The penetration data for the PFF-10 and PFF-20 was not measured.

The data demonstrates that the addition of the calcium chloride is accelerating the setting characteristics and strength gain of the cellular cement mixes contemplated by the present disclosure. At any point where the penetration resistance is greater than zero, the mixture is considered set. Consequently, the time of set can be taken as somewhere between to last zero reading and the first non-zero reading. The data reveals that at the higher concentrations of calcium chloride there is a decrease in set time by 4 to 6 hours over the control mixes. Importantly, because the compositions are foamed, the faster set time of the compositions is not capitalizing on the inherent strength of aggregates and aggregate interlock as in concrete or in a sand/cement flowfill. The Type III cement has a faster strength gain that the type I/II for a given amount of calcium chloride added.

The data demonstrates the strength gain properties of the calcium chloride foamed cement mixes by comparing compressive strengths to control mixes. The most notable differences are in the 4 hour compressive strengths, with the controls being 0, and not set enough to conduct a test, while the calcium chloride accelerated mixes have measurable compressive strengths, with the best mixes approaching or exceeding 20 psi compressive strength in 4 hours. Beyond the 4 hour mark, the compressive strengths at 1, 7, and 28 days are closer to the controls, and the 28 day strengths and removability moduli show that the compositions are excavatable.

It was observed during testing that the prill form of dry calcium chloride was more effective at accelerating the set time of compositions compared to the flake form of dry calcium chloride.

Another notable observation during testing is that compositions using Type III cement responded better to the use of dry calcium chloride than compositions using Type I/II cement and allowed the use of more water in the compositions. For example, compare FPC-5, FPC-10, FPC-15 (Type I/II cement) to FPC-5-3, FPC-10-3, and FPC-15-3 (Type III cement).

TABLE 2

Penetration Resistance Results for Compositions of Example 1.

| | | | Spread | Penetration Resistance (tsf) | | | | | | |
|---|---|---|---|---|---|---|---|---|---|---|
| Mix ID | W/C | UW (pcf) | (in) | 1 hour | 2 hour | 4 hour | 6 hour | 8 hour | 10 hr | 24 hr |
| FPC-0 | 0.60 | 40 | 10.5 | 0 | 0 | 0 | 0 | 0 | 0.25 | 1 |
| FPC-5 | 0.60 | 40 | 9 | 0 | 0 | 0 | 0.25 | 0.5 | 1 | 2.5 |
| FPC-10 | 0.60 | 40 | 8.5 | 0 | 0 | 0.5 | 1 | 1.5 | 2 | 4 |
| FPC-15 | 0.60 | 40 | 9 | 0 | 0 | 0.75 | 1.25 | 1.5 | 2 | 4.5 |
| FPC-0-3 | 0.70 | 40 | 11.5 | 0 | 0 | 0 | 0 | 0 | 0.75 | 4.5 |
| FPC-5-3 | 0.70 | 40 | 12 | 0 | 0 | 0.25 | 0.75 | 1 | 1.25 | 2.75 |
| FPC-10-3 | 0.70 | 40 | 11 | 0 | 0 | 1 | 2.25 | 2.75 | 3.5 | 4.5 |
| FPC-15-3 | 0.70 | 40 | 10 | 0 | 0.5 | 1 | 1.75 | 2 | 2.5 | 4.5 |
| PFF-10 | 0.50 | 40 | 11 | — | — | — | — | — | — | — |
| PFF-20 | 0.50 | 52 | 8 | — | — | — | — | — | — | — |

Example 3

The compressive strength data (psi) at 4 hours, 1 day, 7 days, and 28 days for the compositions disclosed in Example 1 is presented Table 3. Table 3 also discloses the removability modulus for each of the tested compositions. Compositions FPC-0 (Type I/II cement and no calcium chloride) and PFC-0-3 (Type III cement and no calcium chloride) were the control compositions.

TABLE 3

Compressive Strength Results for Compositions of Example 1.

| | Compressive Strength (psi) | | | | |
|---|---|---|---|---|---|
| Mix ID | 4 hour | 1 day | 7 day | 28 day | RE |
| FPC-0 | 0 | 69 | 241 | 334 | 0.48 |
| FPC-5 | 3 | 75 | 236 | 334 | 0.48 |
| FPC-10 | 17 | 73 | 216 | 368 | 0.50 |

TABLE 3-continued

Compressive Strength Results for Compositions of Example 1.

| | Compressive Strength (psi) | | | | |
|---|---|---|---|---|---|
| Mix ID | 4 hour | 1 day | 7 day | 28 day | RE |
| FPC-15 | 11 | 40 | 158 | 289 | 0.45 |
| FPC-0-3 | 0 | 111 | 262 | 351 | 0.49 |
| FPC-5-3 | 11 | 78 | 195 | 299 | 0.45 |
| FPC-10-3 | 25 | 104 | 288 | 369 | 0.51 |
| FPC-15-3 | 14 | 66 | 217 | 328 | 0.48 |
| PFF-10 | 25 | 86 | 269 | 381 | 0.51 |
| PFF-20 | 18 | 78 | 284 | 475 | 0.85 |

Example 4

One of the benefits of using dry calcium chloride as disclosed is that the weight and volume is substantially less compared to liquid calcium chloride. For example, the Table 4 discloses the compositions of Table 1 and lists the amount of dry calcium chloride used in each composition by lb/CY and then lists the amount of liquid calcium chloride necessary to achieve the same calcium chloride equivalent in either lb/CY or gallons/CY. The large weight and volume reduction achieved by using dry calcium chloride in compositions contemplated by the present disclosure compared to liquid calcium chloride is an advantage both economically and logistically. The liquid calcium chloride compositions assume a concentration of 32.5% calcium chloride solids in liquid solution and a specific gravity of 1.351.

TABLE 4

The Amount of Liquid Calcium Chloride Necessary to Achieve the Equivalent Amount of Dry Calcium Chloride in Compositions of Table 1.

| Mix ID | Dry CaCl$_2$ (lb/CY) | Required Liquid CaCl$_2$ (lb/CY) | Required Liquid CaCl$_2$ (gal./CY) |
|---|---|---|---|
| FPC-0 | 0 | 0 | 0 |
| FPC-5 | 28 | 86 | 8 |
| FPC-10 | 54 | 166 | 15 |
| FPC-15 | 79 | 243 | 22 |
| FPC-0-3 | 0 | 0 | 0 |
| FPC-5-3 | 26 | 80 | 7 |
| FPC-10-3 | 51 | 157 | 14 |
| FPC-15-3 | 75 | 231 | 20 |
| PFF-10 | 61 | 188 | 17 |
| PFF-20 | 122 | 375 | 33 |

Example 5

To further understand the advantage of using dry calcium chloride, prior art compositions using non-chloride accelerators (NCA) were prepared according to Table 5.

Prior art compositions 2-A, 2-B, 2-C, 80-32, 80-64, and 80-96 were prepared using Portland cement Type I/II, water and an NCA called Accelguard 80 from Euclid Chemical Company, 19218 Redwood Road, Cleveland, Ohio 44110.

Prior art compositions 3-A, 3-B, and 3-C were prepared using Portland cement Type I/II, water and an NCA called Accelguard 90 from Euclid Chemical Company. Calculations for prior art compositions using Accelguard 80 and Accelguard 90 were performed based on an assumed solid content of 50% with specific gravity of 1.442 for Accelguard 80 and 1.354 for Accelguard 90.

TABLE 5

Prior Art Compositions.

| | Composition (lb/CY) | | | | Composition (%) | | | | Accelerator Doses (fl. Oz./cwt) | | |
|---|---|---|---|---|---|---|---|---|---|---|---|
| | | | | | | | | | | NCA's | |
| MIX ID | Cement | Water | CaCl | NCA | Cement | Water | CaCl | NCA | CaCl | ACG 80 | ACG 90 |
| 2-A | 2061 | 1060 | 0 | 29 | 65.4% | 33.6% | 0.0% | 0.9% | 0 | 32 | 0 |
| 2-B | 2061 | 1089 | 0 | 58 | 64.3% | 33.9% | 0.0% | 1.8% | 0 | 64 | 0 |
| 2-C | 2061 | 1118 | 0 | 87 | 63.1% | 34.2% | 0.0% | 2.7% | 0 | 96 | 0 |
| 80-32 | 2061 | 1060 | 0 | 29 | 65.4% | 33.6% | 0.0% | 0.9% | 0 | 32 | 0 |
| 80-64 | 2061 | 1089 | 0 | 58 | 64.3% | 33.9% | 0.0% | 1.8% | 0 | 64 | 0 |
| 80-96 | 2061 | 1118 | 0 | 87 | 63.1% | 34.2% | 0.0% | 2.7% | 0 | 96 | 0 |
| 3-A | 2061 | 1060 | 0 | 29 | 65.4% | 33.6% | 0.0% | 0.9% | 0 | 0 | 32 |
| 3-B | 2061 | 1089 | 0 | 58 | 64.3% | 33.9% | 0.0% | 1.8% | 0 | 0 | 64 |
| 3-C | 2061 | 1118 | 0 | 87 | 63.1% | 34.2% | 0.0% | 2.7% | 0 | 0 | 96 |

Example 6

Penetration resistance (Table 6) and compressive strength (Table 7) testing was measured for prior art compositions using NCA as the accelerator as disclosed in Table 5.

The NCAs were used in doses that are at the upper limit of what is recommended. At these concentrations, there is a decrease in the time of set and measurable compressive strength at 4 hours. Notably, however, these mixes are not foamed and in an equivalent foamed mix, the expectation would be a 90% reduction in strength across the measured times. This reduction in strength would result in compositions that are not suitable for the uses contemplated by the present disclosure because these mixes will not generate the necessary early strength at 4 hours (i.e., 20 PSI) when they are adequately foamed for excavatability because adequate foaming reduces the overall strength by 90%. The effective w/c for the compositions in Table 6 was calculated assuming 50% solids in Accelguard 80.

TABLE 6

Penetration Resistance Testing of Accelguard 80 and Accelguard 90 Compositions

Euclid AccelGuard 80 & 90 NCA, Cement slurry Penetration Resistance

| Mix ID | ACG (fl.oz/cwt) 80 | ACG (fl.oz/cwt) 90 | Eff. W/C | G.S. (min) | 4 psi (min) | Penetration (tsf) 2 hr | 4 hr | 6 hr | 8 hr | 10 hr |
|---|---|---|---|---|---|---|---|---|---|---|
| 2-A | 32 | — | 0.5 | 60 | 210 | 0 | 1.5 | 75 | 311 | M |
| 2-8 | 64 | — | 0.5 | 60 | 160 | 0 | 0.75 | 86 | 322 | M |
| 2-C | 96 | — | 0.5 | 30 | 90 | 0 | 4 | 115 | 270 | M |
| 3-A | — | 32 | 0.5 | 60 | 140 | 0 | 0.75 | 78 | 245 | M |
| 3-B | — | 64 | 0.5 | 60 | 200 | 0 | 0.25 | 72 | 253 | M |
| 3-C | — | 96 | 0.5 | 60 | 180 | 0 | 0.75 | 109 | 348 | M |

TABLE 7

Compressive Strength Testing of Accelguard 80 Compositions
Euclid AccelGuard 80 NCA Cement slurry Compressive Strength

| Mix ID | ACG (fl.oz/cwt) 80 | ACG (fl.oz/cwt) 90 | Eff. w/c | Eff. w/c | Compressive Strength (psi) 4 hr | 8 hr | 1 day | 7 day | 28 day |
|---|---|---|---|---|---|---|---|---|---|
| 80-32 | 32 | — | 0.5 | 0.51 | 15 | 991 | 3245 | 5530 | 6579 |
| 80-64 | 64 | — | 0.5 | 0.52 | 22 | 723 | 2752 | 5204 | 6725 |
| 80-96 | 96 | — | 0.5 | 0.53 | 74 | 582 | 2335 | 4878 | 6067 |

What is claimed is:

1. A fast setting composition for filling voids comprising:
between 40% and 80% Portland cement by weight of the composition;
between 0.1% and 20% dry calcium chloride by weight of the composition;
between 20% and 50% water by weight of the composition; and
between 0.5% and 10% preformed cellular foam by weight of the composition;
the composition having a compressive strength of between 0.1 psi and 35 psi after 4 hours, a compressive strength of between 30 psi and 150 psi after 24 hours, a compressive strength of between 200 psi and 600 psi after 28 days, a penetration resistance of between 0.1 tsf and 5 tsf after 10 hours, a penetration resistance of between 0.8 tsf and 10 tsf after 24 hours, and a removability modulus of between 0.2 and 1.5 after 28 days.

2. The composition of claim 1, wherein the Portland cement is between 50% and 70% by weight of the composition.

3. The composition of claim 1, wherein the Portland cement is Type I.

4. The composition of claim 1, wherein the Portland cement is Type II.

5. The composition of claim 1, wherein the Portland cement is Type III.

6. The composition of claim 1, wherein the dry calcium chloride is in prill form.

7. The composition of claim 1, wherein the dry calcium chloride is in flake form.

8. The composition of claim 1, wherein the dry calcium chloride is prill form, flake form, powder form, or some combination thereof.

9. The composition of claim 1, wherein the dry calcium chloride is between 3% and 15% by weight of the composition.

10. The composition of claim 1, wherein the dry calcium chloride is between 10% and 15% by weight of the composition.

11. The composition of claim 1, wherein the water is between 30% and 40% by weight of the composition.

12. The composition of claim 1, wherein the preformed cellular foam is between 2% and 4% by weight of the composition.

13. The composition of claim 1, wherein the composition has a compressive strength of between 3 psi and 20 psi after 4 hours, a compressive strength of between 50 psi and 100 psi after 24 hours, a compressive strength of between 290 psi and 500 psi after 28 days, a penetration resistance of between 1.0 tsf and 4 tsf after 10 hours, a penetration resistance of between 2 tsf and 5 tsf after 24 hours, and a removability modulus of between 0.4 and 0.8 after 28 days.

14. The composition of claim 1, further comprising fly ash.

15. The composition of claim 1, wherein the composition has
between 50% and 70% Portland cement by weight of the composition;
between 5% and 15% dry calcium chloride by weight of the composition;
between 30% and 40% water by weight of the composition; and
between 2% and 4% preformed cellular foam by weight of the composition;
the composition having a compressive strength of between 3 psi and 25 psi after 4 hours, a compressive strength of between 60 psi and 110 psi after 24 hours, a compressive strength of between 290 psi and 500 psi after 28 days, a penetration resistance of between 1.0 tsf and 4 tsf after 10 hours, a penetration resistance of between 2 tsf and 5 tsf after 24 hours, and a removability modulus of between 0.4 and 0.8 after 28 days.

16. A fast setting composition for filling voids consisting essentially of:
between 40% and 80% Portland cement by weight of the composition;
between 8% and 17% dry calcium chloride by weight of the composition;
between 20% and 50% water by weight of the composition; and
between 0.5% and 10% preformed cellular foam by weight of the composition;

the composition having a compressive strength of between 0.1 psi and 30 psi after 4 hours, a compressive strength of between 30 psi and 120 psi after 24 hours, a compressive strength of between 200 psi and 500 psi after 28 days, a penetration resistance of between 0.1 tsf and 5 tsf after 10 hours, a penetration resistance of between 0.8 tsf and 10 tsf after 24 hours, and a removability modulus of between 0.2 and 1.0 after 28 days.

* * * * *